United States Patent
Koike et al.

(10) Patent No.: US 9,533,268 B2
(45) Date of Patent: Jan. 3, 2017

(54) METHOD AND APPARATUS FOR SUPPLYING MIXED GAS

(71) Applicants: Iwatani Corporation, Osaka (JP); CENTRAL GLASS COMPANY, LIMITED, Yamaguchi (JP)

(72) Inventors: Kunihiko Koike, Shiga (JP); Yu Yoshino, Shiga (JP); Naohisa Makihira, Tokyo (JP); Takehiko Senoo, Osaka (JP); Toshihiro Aida, Tokyo (JP); Tomoya Biro, Tokyo (JP); Hiroshi Ichimaru, Yamaguchi (JP); Masahiro Tainaka, Yamaguchi (JP)

(73) Assignees: IWATANI CORPORATION, Osaka (JP); CENTRAL GLASS COMPANY, LIMITED, Yamaguchi (JP)

( * ) Notice: Subject to any disclaimer, the term of this patent is extended or adjusted under 35 U.S.C. 154(b) by 3 days.

(21) Appl. No.: 14/511,214

(22) Filed: Oct. 10, 2014

(65) Prior Publication Data

US 2015/0020890 A1   Jan. 22, 2015

Related U.S. Application Data

(63) Continuation of application No. PCT/JP2013/060284, filed on Apr. 4, 2013.

(30) Foreign Application Priority Data

Apr. 13, 2012 (JP) .................................. 2012-091508

(51) Int. Cl.
*B01F 5/10* (2006.01)
*G05D 11/13* (2006.01)
(Continued)

(52) U.S. Cl.
CPC ............... *B01F 5/10* (2013.01); *B01F 15/005* (2013.01); *B01F 15/00162* (2013.01);
(Continued)

(58) Field of Classification Search
CPC ..... B01F 5/10; B01F 15/00162; B01F 15/026; B01F 15/005; G05D 11/001; F17C 7/00; Y10T 137/8766; Y10T 137/0391
See application file for complete search history.

(56) References Cited

U.S. PATENT DOCUMENTS 3,515,155 A * 6/1970 Haffner ................. A61M 16/12
137/207
5,676,736 A    10/1997 Crozel
(Continued)

FOREIGN PATENT DOCUMENTS

JP      8-312898      11/1996
JP    2002-511133      4/2002
(Continued)

OTHER PUBLICATIONS

International Search Report issued Jul. 9, 2013 in International (PCT) Application No. PCT/JP2013/060284.

*Primary Examiner* — Michael R Reid
*Assistant Examiner* — Patrick Williams
(74) *Attorney, Agent, or Firm* — Wenderoth, Lind & Ponack, L.L.P.

(57) ABSTRACT

A method and apparatus, for supplying high-pressure mixed gas of a low-vapor-pressure first gas as an active gas and a high-vapor-pressure second gas, are arranged to reduce an amount of the first gas discarded. The mixed gas in a high-pressure state is supplied from a mixing container to a use point. Upon reduction of pressure in the mixing container to a setpoint as a result of supply to the use point, a predetermined amount of the first gas is charged into a (Continued)

replenishment container connected to the mixing container by a replenishment line having a replenishment valve, and which is evacuated. As the second gas is charged into the replenishment container charged with the first gas, the replenishment valve is opened such that the first gas in the replenishment container is forced out by the second gas, thereby charging the mixing container with the mixed gas in the high-pressure condition.

8 Claims, 3 Drawing Sheets

(51) Int. Cl.
    *G05D 11/00*          (2006.01)
    *B01F 15/00*          (2006.01)
    *B01F 15/02*          (2006.01)

(52) U.S. Cl.
    CPC .......... B01F 15/026 (2013.01); G05D 11/001 (2013.01); G05D 11/138 (2013.01); *Y10T 137/0391* (2015.04); *Y10T 137/8766* (2015.04)

(56) References Cited

U.S. PATENT DOCUMENTS

| | | | | |
|---|---|---|---|---|
| 5,967,156 A * | 10/1999 | Rose | ..................... | B08B 7/0092 134/7 |
| 6,217,659 B1 * | 4/2001 | Botelho | ................. | B01F 3/026 118/715 |
| 6,722,399 B1 * | 4/2004 | Cano | ........................ | F17C 7/00 141/18 |
| 6,772,781 B2 * | 8/2004 | Doty | .................... | G05D 11/132 137/597 |
| 6,884,296 B2 * | 4/2005 | Basceri | ............. | C23C 16/45514 118/715 |
| 8,453,600 B2 * | 6/2013 | Miyashita | ............. | C23C 16/345 118/723 E |
| 8,627,856 B2 * | 1/2014 | McHugh | ............. | B01F 13/1055 141/104 |
| 2003/0203606 A1 | 10/2003 | Maekawa | | |
| 2011/0147896 A1 | 6/2011 | Koike et al. | | |

FOREIGN PATENT DOCUMENTS

| | | |
|---|---|---|
| JP | 3989286 | 10/2007 |
| JP | 2008-543563 | 12/2008 |
| JP | 2009-94401 | 4/2009 |
| JP | 2009-97573 | 5/2009 |
| JP | 2009-108925 | 5/2009 |
| JP | 2009-197274 | 9/2009 |
| WO | 98/48215 | 10/1998 |
| WO | 2007/002288 | 1/2007 |
| WO | 2009/057065 | 5/2009 |
| WO | 2009/066139 | 5/2009 |
| WO | 2010/021265 | 2/2010 |

* cited by examiner

METHOD AND APPARATUS FOR SUPPLYING MIXED GAS

TECHNICAL FIELD

The present invention relates to a method and an apparatus for supplying a mixed gas in a high-pressure state prepared by mixing a low-vapor-pressure gas and a high-vapor-pressure gas and used in a surface processing process such as film forming or etching or in a cleaning process, for example, in semiconductor manufacturing, liquid crystal manufacturing, MEMS manufacturing or solar cell manufacturing.

BACKGROUND ART

As a process of manufacturing a semiconductor, a liquid crystal, an MEMS or a solar cell for example, a process is known in which a mixed gas prepared by mixing a low-vapor-pressure gas such as hydrogen fluoride (HF), chlorine trifluoride ($ClF_3$) or boron trichloride ($BCl_3$) provided as an active gas and a high-vapor-pressure gas such as argon (Ar), helium (He) or nitrogen ($N_2$) provided as a diluting gas is used in a film forming step, an etching step for removing silicon, tungsten, aluminum or the like, or a cleaning step, and in which the interior of a manufacturing apparatus is evacuated with a vacuum pump to be in a low-pressure state and plasma etching is thereafter performed by introducing the mixed gas (see, for example, Patent Literature 1).

An apparatus using a booster pump, a compressor or the like for mixing a low-vapor-pressure gas and a high-vapor-pressure gas is also known (see, for example, Patent Literature 2).

Further, an apparatus is known in which a mixing container is charged with a mixed gas in a high-pressure state prepared by mixing a low-vapor-pressure gas provided as an active gas and a high-vapor-pressure gas provided as a diluting gas and the mixed gas is supplied in the high-pressure state from this mixing container to a use point and is ejected in the high-pressure state at the use point while being adiabatically expanded to generate a reactive cluster, thereby processing a surface of a semiconductor for example (see, for example, Patent Literature 3).

CITATION LIST

Patent Literature

Patent Literature 1: Japanese Patent No. 3989286
Patent Literature 2: Japanese Publication of International Patent Application No. 2008-543563
Patent Literature 3: WO2010/021265

SUMMARY OF INVENTION

Technical Problem

The related art described in Patent Literature 1 has a problem in that the mixed gas is in a low-pressure state and is not capable of supplying a mixed gas in a high-pressure condition to a use point.

The related art described in Patent Literature 2 has a problem in that intrusion of impurities into the mixed gas and a leak of the mixed gas to the outside due to the operation of a booster pump, a compressor or the like can occur easily.

The related art described in Patent Literature 3 has a problem in that when the pressure in the mixing container is reduced to a pressure required at a use point as a result of supply of the mixed gas in the mixing container to the use point, it is necessary to return the pressure of the mixed gas in the mixing container to the high-pressure state by discarding the mixed gas remaining in the mixing container with a vacuum pump, thereafter charging the low-vapor-pressure active gas and subsequently charging the high-vapor-pressure diluting gas in order to replenish the mixing container with the low-vapor-pressure active gas in the mixed gas; there is a need to discard the remaining mixed gas and a waste of the mixed gas is caused by discarding.

There is also a problem that discarding with the vacuum pump is time-consuming and it is necessary to stop the supply of the mixed gas to the use point during discarding with the vacuum pump.

The present invention aims to solve by one effort the problem with the related art described in Patent Literature 1, i.e., the problem that a mixed gas in a high-temperature condition required at a use point cannot be supplied, the problem with the related art described in Patent Literature 2, i.e., the problem that intrusion of impurities into the mixed gas and a leak of the mixed gas through a booster pump, a compressor or the like can occur easily, and the problem with the related art described in Patent literature 3, i.e., the problem of a wasteful discard of the mixed gas and stoppage of supply of the mixed gas to a use point, and an object of the present invention is to provide a method and an apparatus for supplying a mixed gas in which a high-vapor-pressure second gas as a diluting gas is charged into a replenishment container charged with a low-vapor-pressure first gas as an active gas and a replenishment valve is simultaneously opened to cause the first gas in the replenishment container to be forced out by the second gas, whereby a mixing container is replenished with the mixed gas in a high-pressure state.

Solution to Problem

A mixed gas supply method of a first aspect of the present invention is a mixed gas supply method in which a mixed gas in a high-pressure state prepared by mixing a low-vapor-pressure first gas and a high-vapor-pressure second gas is supplied to a use point from a mixing container charged with the mixed gas in the high-pressure state, and the mixing container is replenished with the mixed gas in the high-pressure state when the pressure in the mixing container is reduced to a setpoint as a result of the supply to the use point, the method including charging a predetermined amount of the first gas into a replenishment container which is connected to the mixing container by a replenishment line having a replenishment valve, and which is evacuated, and charging the second gas into the replenishment container charged with the first gas and simultaneously opening the replenishment valve to cause the first gas in the replenishment container to be forced out by the second gas, whereby the mixing container is replenished with the mixed gas in the high-pressure state.

According to a second aspect of the present invention, the internal capacity of the replenishment container is equal to or larger than $1/100$ of the internal capacity of the mixing container and equal to or smaller than $1/5$ of the internal capacity of the mixing container.

According to a third aspect of the present invention, the equivalent circle diameter of a cross-section of the internal space of the replenishment container defined by equation (1):

$$S = \pi D^2/4 \qquad (1)$$

where D is the equivalent circle diameter (mm), S is the sectional area of the internal space of the replenishment container (mm$^2$), and $\pi$ is the ratio of the circumference of a circle to its diameter, is equal to or larger than 1/100 of the height of the internal space of the replenishment container and equal to or smaller than 1/2 of the height of the internal space of the replenishment container.

According to a fourth aspect of the present invention, a predetermined amount of the first gas is charged into a plurality of replenishment containers which are connected in parallel with each other to the mixing container by replenishment lines having replenishment valves, and which are evacuated; the second gas is charged into one of the replenishment containers charged with the first gas and the replenishment valve is simultaneously opened to cause the first gas in the replenishment container to be forced out by the second gas so that the mixing container is replenished with the mixed gas in the high-pressure state, while the mixed gas in the high-pressure state is being supplied from the mixing container to the use point; and the second gas is successively charged into another of the replenishment containers charged with the first gas and the replenishment valve is simultaneously opened to cause the first gas in the another of the replenishment containers to be forced out by the second gas, whereby the mixing container can be repeatedly replenished with the mixed gas in the high-pressure state.

According to a fifth aspect of the present invention, the low-vapor-pressure first gas has a boiling point equal to or higher than 0° C. and equal to or lower than 100° C.

According to a sixth aspect of the present invention, the high-vapor-pressure second gas has a boiling point equal to or lower than −30° C.

According to a seventh aspect of the present invention, the pressure at which the mixed gas is supplied to the use point is equal to or higher than 0.5 MPa and equal to or lower than 15 MPa in terms of absolute pressure.

A mixed gas supply apparatus of the present invention is a mixed gas supply apparatus including a mixing container which is charged with a mixed gas in a high-pressure state prepared by mixing a low-vapor-pressure first gas having a boiling point equal to or higher than 0° C. and equal to or lower than 100° C. and a high-vapor-pressure second gas having a boiling point equal to or lower than −30° C., and from which the mixed gas is supplied to a use point at a pressure equal to or higher than 0.5 MPa and equal to or lower than 15 MPa in terms of absolute pressure, and means for replenishing the mixing container with the mixed gas in the high-pressure state when the pressure in the mixing container is reduced to a setpoint as a result of supply of the mixed gas to the use point, wherein a replenishment container having an internal capacity equal to or larger than 1/100 of the internal capacity of the mixing container and equal to or smaller than 1/5 of the internal capacity of the mixing container is formed, wherein the equivalent circle diameter of a cross-section of the internal space of the replenishment container defined by equation (1):

$$S = \pi D^2/4 \qquad (1)$$

where D is the equivalent circle diameter (mm), S is the sectional area of the internal space of the replenishment container (mm$^2$), and $\pi$ is the ratio of the circumference of a circle to its diameter, is equal to or larger than 1/100 of the height of the internal space of the replenishment container and equal to or smaller than 1/2 of the height of the internal space of the replenishment container, wherein the replenishment container and the mixing container are connected to each other by a replenishment line having a replenishment valve; a first container containing the first gas is connected to the replenishment container by a first gas line having a first gas valve; a second container containing the second gas is connected to the replenishment container by a second gas line having a second gas valve; and a vacuum pump is connected to the replenishment container by a discharge line having a discharge valve, wherein the replenishment container in an evacuated state is charged with a predetermined amount of the first gas by opening the replenishment valve, and wherein detection means for detecting the pressure in the mixing container is formed and, when the pressure detected by the detection means is reduced to a setpoint as a result of supply of the mixed gas in the high-pressure state to the use point, the second gas valve is opened to charge the second gas into the replenishment container charged with the first gas and the replenishment valve is simultaneously opened to cause the first gas in the replenishment container to be forced out by the second gas, whereby the mixing container is replenished with the mixed gas in the high-pressure state.

Advantageous Effects of Invention

In the mixed gas supply method of the first aspect of the present invention, a predetermined amount of the low-vapor-pressure first gas is charged into the evacuated replenishment container, the high-vapor-pressure second gas is charged into the replenishment container charged with the first gas, and the replenishment valve is simultaneously opened to cause the first gas in the replenishment container to be forced out by the second gas, whereby the mixing container is replenished with the mixed gas in the high-pressure state. This method therefore enables prevention of intrusion of impurities, minimizes the amount of the mixed gas discard in the mixing container and enables continuously supplying the mixed gas to the use point without interruption.

In the mixed gas supply method of the second aspect of the present invention, the internal capacity of the replenishment container is equal to or larger than 1/100 of the internal capacity of the mixing container and equal to or smaller than 1/5 of the internal capacity of the mixing container. This method therefore enables reducing the replenishment container installation space while limiting the frequency of replenishment with the mixed gas. This is an additional effect to the effect of the first aspect of the present invention.

That is, if the internal capacity is smaller than 1/100, the unit replenishable capacity is small, there is a need to frequently repeat replenishment and a time restriction is imposed on supply of the mixed gas. If the capacity exceeds 1/5, the space in which the replenishment container is installed is increased, which is undesirable in terms of manufacture of the apparatus. Further, the amount of the first gas discarded is increased.

In the mixed gas supply method of the third aspect of the present invention, the equivalent circle diameter of a cross-section of the internal space of the replenishment container is equal to or larger than 1/100 of the height of the internal space of the replenishment container and equal to or smaller than 1/2 of the height of the internal space of the replenishment container. This method therefore inhibits the first gas and second gas from easily mixing with each other in the replenishment container and enables reducing the concentration of the first gas in the mixed gas in the replenishment container to be discarded after replenishment of the mixing container with the mixed gas from the replenishment container and reducing the amount of the discard from the first gas high-priced in comparison with the second gas. This is an additional effect to the effect of the first aspect of the present invention.

In the mixed gas supply method of the fourth aspect of the present invention, a plurality of replenishment containers are formed, the first gas in one of the replenishment containers is forced out by the second gas to replenish the mixing container with the mixed gas in the high-pressure state, and the first gas in another of the replenishment containers is successively forced out by the second gas, thus enabling the mixing container to be repeatedly replenished with the mixed gas in the high-pressure state. This method therefore enables continuously supplying the mixed gas to the use point without interruption even when the amount of the mixed gas used at the use point is large. This is an additional effect to the effect of the first aspect of the present invention.

In the mixed gas supply method of the fifth aspect of the present invention, the low-vapor-pressure first gas has a boiling point equal to or higher than 0° C. and can therefore be charged in gaseous form into the replenishment container without being liquefied. Also, the boiling point is equal to or lower than 100° C. The first gas can therefore be charged into the replenishment container by obtaining a vapor pressure. This is an additional effect to the effect of the first aspect of the present invention.

In the mixed gas supply method of the sixth aspect of the present invention, the high-vapor-pressure second gas has a boiling point equal to or lower than −30° C. The necessary high-pressure condition of the mixed gas at the use point can therefore be obtained. This is an additional effect to the effect of the first aspect of the present invention.

In the mixed gas supply method the second aspect of the present invention, the pressure at which the mixed gas is supplied to the use point is equal to or higher than 0.5 MPa and equal to or lower than 15 MPa in terms of absolute pressure. The mixed gas having a high pressure at the use point can be supplied. This is an additional effect to the effect of the first aspect of the present invention.

The mixed gas supply apparatus of the present invention includes a mixing container which is charged with a mixed gas in a high-pressure state prepared by mixing a low-vapor-pressure first gas having a boiling point equal to or higher than 0° C. and equal to or lower than 100° C. and a high-vapor-pressure second gas having a boiling point equal to or lower than −30° C., and from which the mixed gas is supplied to a use point at a pressure equal to or higher than 0.5 MPa and equal to or lower than 15 MPa in terms of absolute pressure, and means for replenishing the mixing container with the mixed gas in the high-pressure state when the pressure in the mixing container is reduced to a setpoint as a result of supply of the mixed gas to the use point, wherein a replenishment container having an internal capacity equal to or larger than 1/100 of the internal capacity of the mixing container and equal to or smaller than 1/5 of the internal capacity of the mixing container and having an equivalent circle diameter of a cross-section equal to or larger than 1/100 of the height of the internal space of the replenishment container and equal to or smaller than 1/2 of the height of the internal space of the replenishment container is formed, wherein the equivalent circle diameter of a cross-section of the internal space of the replenishment container is equal to or larger than 1/100 of the height of the internal space of the replenishment container and equal to or smaller than 1/2 of the height of the internal space of the replenishment container, wherein the replenishment container and the mixing container are connected to each other by a replenishment line having a replenishment valve; a first container containing the first gas is connected to the replenishment container by a first gas line having a first gas valve; a second container containing the second gas is connected to the replenishment container by a second gas line having a second gas valve; and a vacuum pump is connected to the replenishment container by a discharge line having a discharge valve, wherein the replenishment container in an evacuated state is charged with a predetermined amount of the first gas by opening the replenishment gas valve, and wherein detection means for detecting the pressure in the mixing container is formed and, when the pressure detected by the detection means is reduced to a setpoint as a result of supply of the mixed gas in the high-pressure state to the use point, the second gas valve is opened to charge the second gas into the replenishment container charged with the first gas and the replenishment valve is simultaneously opened to cause the first gas in the replenishment container to be forced out by the second gas, whereby the mixing container is replenished with the mixed gas in the high-pressure state. The apparatus can thus be arranged to have the effects based on the mixed gas supply method according to any one of the first to third and fifth to seventh aspects of the present invention.

DESCRIPTION OF EMBODIMENTS

Mixed gas supply methods and mixed gas supply apparatuses according to embodiments of the present invention will be described based on FIGS. 1 and 2 with reference to FIG. 3.

Figure 1:
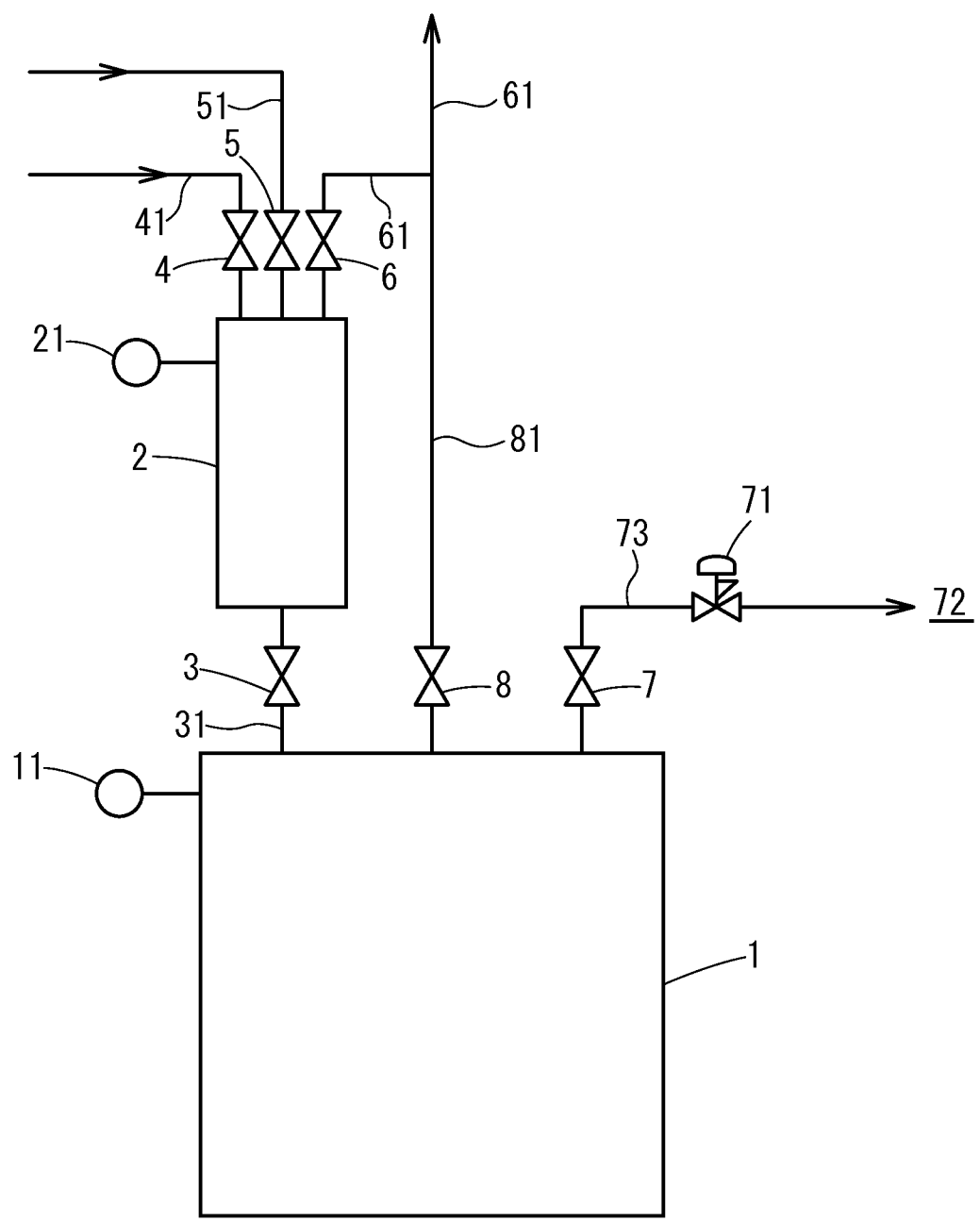
FIG. 1 is a diagram schematically showing an outline of a method and an apparatus for supplying a mixed gas according to a first embodiment of the present invention.

In FIG. 1 showing the first embodiment, reference numeral 1 denotes a mixing container charged with a mixed gas in a high-pressure state prepared by mixing a low-vapor-pressure first gas and a high-vapor-pressure second gas.

Reference numeral 2 denotes a replenishment container. A lower portion of the replenishment container 2 is connected to an upper portion of the mixing container 1 by a replenishment line 31 in which a replenishment valve 3 is provided.

A first container (not shown) containing the first gas is connected to an upper portion of the replenishment container 2 by a first gas line 41 in which a pressure control valve (not shown) and a first gas valve 4 are provided. A second container (not shown) containing the second gas is connected to an upper portion of the replenishment container 2 by a second gas line 51 in which a pressure control valve (not shown) and a second gas valve 5 are provided. A discharge line 61 in which a first discharge valve 6 for evacuating the replenishment container 2 with a vacuum pump (not shown) is provided is connected to an upper portion of the replenishment container 2.

A supply line 73 in which a supply valve 7 and a pressure control valve 71 are provided and through which the mixed gas is supplied to a use point 72 is connected to an upper portion of the mixing container 1. A discharge line 81 through which the mixed gas in the mixing container 1 is discharged with the vacuum pump and in which a second discharge valve 8 is provided is also connected to the upper portion of the mixing container 1. A downstream portion of the discharge line 81 merges with the discharge line 61 from the replenishment container 2.

A Fourier-transform-type infrared absorption spectrometer (not shown) is connected to the supply line 73 to enable measurement of the concentration of the first gas in the mixed gas supplied from the mixing container 1.

An adsorption device (not shown) containing an adsorbent is provided in the discharge line 61 to capture the first gas from the mixed gas discarded from the replenishment container 2 and to add up and measure the mass of the first gas with a load cell.

The discharge line 81 is connected to the mixing container 1 but discharge of the mixed gas in the mixing container 1 is performed at the time of the first evacuation immediately after starting the operation of the mixed gas supply apparatus or at the time of check or maintenance after operating the apparatus for a long time period. During the normal operation, only discharge of the mixed gas in the replenishment container 2 is performed and discharge of the mixed gas in the mixing container 1 is not performed.

Reference numeral 11 denotes a pressure detector for detecting the pressure of the mixed gas in the mixing container 1. Reference numeral 21 denotes a pressure detector for detecting the pressure in the replenishment container 2.

As described above, the mixed gas supply apparatus according to this embodiment is a mixed gas supply apparatus provided with the mixing container 1 which is charged with the mixed gas in a high-pressure state prepared by mixing a low-vapor-pressure first gas and a high-vapor-pressure second gas, and from which the mixed gas is supplied to the use point 72, and means for replenishing the mixing container 1 with the mixed gas in the high-pressure state when the pressure in the mixing container 1 is reduced to a setpoint as a result of supply of the mixed gas in the high-pressure state to the use point 72. In the mixed gas supply apparatus, the replenishment container 2 having an internal capacity smaller than that of the mixing container 1 is formed; the replenishment container 2 and the mixing container 1 are connected to each other by the replenishment line 31 in which the replenishment valve 3 is provided; the first container containing the first gas is connected to the replenishment container 2 by the first gas line 41 in which the first gas valve 4 is provided; the second container containing the second gas is connected to the replenishment container 2 by the second gas line 51 in which the second gas valve 5 is provided; the vacuum pump is connected to the replenishment container 2 by the discharge line 61 in which the first discharge valve 6 is provided; a predetermined amount of the first gas is charged into the replenishment container 2 in an evacuated state by opening the first gas valve 4; the pressure detector 11 for detecting the pressure in the mixing container 1 is formed; and, when the pressure detected by the pressure detector 11 is reduced to the setpoint as a result of supply of the mixed gas in the high-pressure state to the use point 72, the second gas valve 5 is opened to charge the second gas into the replenishment container 2 charged with the first gas and the replenishment valve 3 is simultaneously opened to cause the first gas in the replenishment container 2 to be forced out by the second gas, whereby the mixing container 1 is replenished with the mixed gas in the high-pressure state.

In the method of supplying the mixed gas to the use point 72, the mixed gas in a high-pressure state prepared by mixing the low-vapor-pressure first gas and the high-vapor-pressure second gas is supplied to the use point 72 from the mixing container 1 charged with the mixed gas in the high-pressure state, and the mixing container 1 is replenished with the mixed gas in the high-pressure state from the replenishment container 2 when the pressure in the mixing container 1 is reduced to a setpoint as a result of the supply to the use point 72.

In a concrete method of replenishing the mixing container 1 with the mixed gas in the high-pressure state from the replenishment container 2, the replenishment container 2 is first evacuated with the vacuum pump connected by the discharge line 61 and the first gas valve 4 is then opened to charge the replenishment container 2 with the first gas from the first gas line 41 and is closed after a predetermined value is reached by the pressure detector 21 in the replenishment container 2.

Subsequently, the second gas valve 5 is opened and the replenishment container 2 charged with the first gas is charged with the second gas at the predetermined pressure from the second gas line 51 through the pressure control valve. Simultaneously, the replenishment valve 3 is opened and the first gas in the replenishment container 2 is forced out by the second gas, thereby replenishing the mixing container 1 with the mixed gas in the high-pressure state.

The replenishment valve 3 may be opened simultaneously with opening of the second gas valve 5 or slightly after opening of the second gas valve 5. The pressure in the replenishment container 2 may be increased by opening the replenishment valve 3 slightly after opening of the second gas valve 5 in order to prevent backflow of the mixed gas from the mixing container 1 to the replenishment container 2.

Amounts of the low-vapor-pressure first gas supplied to the use point 72, amounts of the first gas discarded from the replenishment container 2, etc., which are calculated values empirically obtained by the applicants of the present invention according to various shape specifications and charge specifications for the replenishment container 2, are shown below.

The low-vapor-pressure first gas as an active gas is assumed to be a halogen or halogenide gas such as hydrogen fluoride (HF), chlorine trifluoride ($ClF_3$) or boron trichloride ($BCl_3$) having a boiling point equal to or higher than 0° C. and equal to or lower than 100° C.

The first gas can be charged into the replenishment container 2 without being liquefied if its boiling point is equal to or higher than 0° C. A vapor pressure necessary for charging the first gas into the replenishment container 2 can be obtained if the boiling point is equal to or lower than 100° C.

The high-vapor-pressure second gas as a diluting gas is assumed to be an inactive gas such as argon (Ar), helium (He) or nitrogen ($N_2$), oxygen ($O_2$), ammonia ($NH_3$) or chlorine ($Cl_2$) having a boiling point equal to or lower than −30° C.

The necessary high-pressure state of the mixed gas at the use point 72 can be obtained if the boiling point of the second gas is equal to or lower than −30° C.

Conditions for implementation plans 1 to 8 and a comparative example described below of the present invention are: using hydrogen fluoride (HF) as the first gas and using argon (Ar) as the second gas; setting the concentration of hydrogen fluoride in the mixed gas to 10%; setting the pressure of the mixed gas in the mixing container 1 after charge to 1050 kPa (absolute pressure, pressures being indicated in terms of absolute pressure in the following); and maintaining the pressure in the mixing container 1 at 900 kPa or higher with reference to a required pressure of the mixed gas at the use point 72.

For the purpose of checking the effects and functions according to the shape specifications and charge specifications for the replenishment container 2, conditions for replenishment of the mixing container 1 with the mixed gas when the pressure in the mixing container 1 is reduced to a setpoint of 900 kPa, 1035 kPa, 950 kPa or 1000 kPa as a result of the supply to the use point 72 were set.

The comparative example, however, was compared with implementation plans 1 to 8 by selecting the setpoint 900 kPa since maintaining the pressure in the mixing container 1 at a pressure equal to or higher than 900 kPa suffices in the comparative example.

Each of the pressure detectors 11 and 21 connected to the mixing container 1 and the replenishment container 2 is capable of measuring pressures equal to or higher than 0 kPa and equal to or lower than 1100 kPa.

The material of the mixing container 1 in implementation plans 1 to 8 and the comparative example is stainless steel and the internal capacity of the mixing container 1 is 38 L.

The material of the replenishment container 2 in implementation plans 1 to 8 is stainless steel, as is that of the mixing container 1. The shape of the replenishment container 2 is cylindrical.

The shape specifications of the replenishment container 2 in the implementation plans 1 to 8, the charge specifications of the replenishment container 2 and the pressure in the mixing container 1 are as shown in Table 1.

TABLE 1

| | Replenishment container shape specifications | | | Replenishment container charge specifications | | Mixing container pressure | | Volume of HF used |
|---|---|---|---|---|---|---|---|---|
| | Diameter [mm] | Height [mm] | Capacity [L] | HF charging pressure [kPa] | Amount of HF charged [g] | Before charge [kPa] | Used pressure difference [kPa] | With respect to 1 atm [L] |
| Implementation plan1 | 108.3 | 434 | 4.0 | 157 | 5.53 | 900 | 150 | 5.63 |
| Implementation plan2 | 50 | 200 | 0.39 | 157 | 0.54 | 1035 | 15 | 0.56 |
| Implementation plan3 | 137 | 548 | 8.1 | 93 | 6.62 | 900 | 150 | 5.63 |
| Implementation plan4 | 136 | 275 | 4.0 | 172 | 6.06 | 900 | 150 | 5.63 |
| Implementation plan5 | 37.1 | 3700 | 4.0 | 150 | 5.29 | 900 | 150 | 5.63 |
| Implementation plan6 | 108.3 | 434 | 4.0 | 105 | 3.70 | 950 | 100 | 3.75 |
| Implementation plan7 | 108.3 | 434 | 4.0 | 52 | 1.83 | 1000 | 50 | 1.88 |
| Implementation plan8 | 37.1 | 3700 | 4.0 | 150 | 5.29 | 900 | 150 | 5.63 |
| Comparative example | — | — | [38] | [105] | [35.2] | 900 (Before discharge) | 150 | 5.63 |

| | Amount of HF used [g] | Amount of HF discarded [g] | HF use rate [%] | HF discard rate [%] | HF use rate ratio [%] to comparative example | HF discard rate ratio [%] to comparative example | HF discard amount ratio [%] to comparative example |
|---|---|---|---|---|---|---|---|
| Implementation plan1 | 5.02 | 0.508 | 90.8 | 9.2 | 636 | 10.7 | 1.7 |
| Implementation plan2 | 0.502 | 0.041 | 92.5 | 7.5 | 647 | 8.8 | — |
| Implementation plan3 | 5.02 | 1.60 | 75.9 | 24.1 | 531 | 28.1 | 5.3 |
| Implementation plan4 | 5.02 | 1.03 | 83.0 | 17.0 | 581 | 19.9 | 3.4 |
| Implementation plan5 | 5.02 | 0.264 | 95.0 | 5.0 | 665 | 5.8 | 0.88 |
| Implementation plan6 | 3.35 | 0.351 | 90.5 | 9.5 | 634 | 11.1 | — |
| Implementation plan7 | 1.67 | 0.158 | 91.4 | 8.6 | 640 | 10.0 | — |
| Implementation plan8 | 5.02 | 0.264 | 95.0 | 5.0 | 665 | 5.8 | 0.88 |
| Comparative example | 5.02 | 30.14 | 14.3 | 85.7 | — | — | — |

That is, the internal capacity of the replenishment container 2 in implementation plan 1 is 4 L, i.e., 1/9.5 of the internal capacity of the mixing container 1; the height of the cylindrical internal space of the replenishment container 2 is 434 mm; and the diameter of a cross-section of the internal space is 108.3 mm and slightly smaller than ¼ of the height.

The HF charging pressure at which HF is charged into the replenishment container 2 in implementation plan 1 is 157 kPa; the amount of HF thereby charged is 5.53 g; and the pressure of the mixed gas before charging the mixing container 1 from the replenishment container 2 is 900 kPa. Accordingly, the pressure difference used for supply of the mixed gas from the mixing container 1 to the use point 72 is 150 kPa.

The internal capacity of the replenishment container 2 in implementation plan 2 is 0.39 L, i.e., about ¹⁄₁₀₀ of the internal capacity of the mixing container 1; the height of the cylindrical internal space of the replenishment container 2 is 200 mm; and the diameter of a cross-section of the internal space is 50 mm, i.e., ¼ of the height. In implementation plan 2, replenishment from the replenishment container 2 is performed when the pressure in the mixing container 1 is 1035 kPa before reduction to 900 kPa, because the internal capacity of the replenishment container 2 is small. The pressure is increased by continuously performing replenishment while the mixed gas is being supplied from the mixing container 1 to the use point 72, i.e., without stopping the supply of the mixed gas from the mixing container 1 to the use point 72.

The HF charging pressure at which HF is charged into the replenishment container 2 in implementation plan 2 is 157 kPa; the amount of HF thereby charged is 0.54 g; and the pressure of the mixed gas before charging the mixing container 1 from the replenishment container 2 is 1035 kPa. Accordingly, the pressure difference used for supply of the mixed gas from the mixing container 1 to the use point 72 is 15 kPa.

The internal capacity of the replenishment container 2 in implementation plan 3 is 8.1 L, i.e., about ⅕ of the internal capacity of the mixing container 1; the height of the cylindrical internal space of the replenishment container 2 is 548 mm; and the diameter of a cross-section of the internal space is 137 mm, i.e., ¼ of the height.

The HF charging pressure at which HF is charged into the replenishment container 2 in implementation plan 3 is 93 kPa; the amount of HF thereby charged is 6.62 g; and the pressure of the mixed gas before charging the mixing container 1 from the replenishment container 2 is 900 kPa, as is that in implementation plan 1. Accordingly, the pressure difference used for supply of the mixed gas from the mixing container 1 to the use point 72 is 150 kPa.

The internal capacity of the replenishment container 2 in implementation plan 4 is 4 L, i.e., 1/9.5 of the internal capacity of the mixing container 1, as is that in implementation plan 1; the height of the cylindrical internal space of the replenishment container 2 is 275 mm; and the diameter of a cross-section of the internal space is 136 mm, i.e., about ½ of the height.

The HF charging pressure at which HF is charged into the replenishment container 2 in implementation plan 4 is 172 kPa; the amount of HF thereby charged is 6.06 g; and the pressure of the mixed gas before charging the mixing container 1 from the replenishment container 2 is 900 kPa, as is that in implementation plan 1. Accordingly, the pressure difference used for supply of the mixed gas from the mixing container 1 to the use point 72 is 150 kPa.

The internal capacity of the replenishment container 2 in implementation plan 5 is 4 L, i.e., 1/9.5 of the internal capacity of the mixing container 1, as is that in implementation plan 1; the height of the cylindrical internal space of the replenishment container 2 is 3700 mm; and the diameter of a cross-section of the internal space is 37.1 mm, i.e., about ¹⁄₁₀₀ of the height.

The HF charging pressure at which HF is charged into the replenishment container 2 in implementation plan 5 is 150 kPa; the amount of HF thereby charged is 5.29 g; and the pressure of the mixed gas before charging the mixing container 1 from the replenishment container 2 is 900 kPa, as is that in implementation plan 1. Accordingly, the pressure difference used for supply of the mixed gas from the mixing container 1 to the use point 72 is 150 kPa.

The shape specifications (the internal capacity, the height of the internal space and the diameter of a cross-section of the internal space) of the replenishment container 2 in implementation plan 6 are the same as those in implementation plan 1. In implementation plan 6, however, replenishment from the replenishment container 2 is performed while the mixed gas is being supplied from the mixing container 1 to the use point 72, that is, when the pressure in the mixing container 1 is 950 kPa before reduction to 900 kPa. The pressure is increased by continuously performing replenishment without stopping the supply of the mixed gas from the mixing container 1 to the use point 72.

The HF charging pressure at which HF is charged into the replenishment container 2 in implementation plan 6 is 105 kPa; the amount of HF thereby charged is 3.70 g; and the pressure of the mixed gas before charging the mixing container 1 from the replenishment container 2 is 950 kPa as described above. Accordingly, the pressure difference used for supply of the mixed gas from the mixing container 1 to the use point 72 is 100 kPa.

The shape specifications (the internal capacity, the height of the internal space and the diameter of a cross-section of the internal space) of the replenishment container 2 in implementation plan 7 are the same as those in implementation plan 1. In implementation plan 7, however, replenishment from the replenishment container 2 is performed while the mixed gas is being supplied from the mixing container 1 to the use point 72, that is, when the pressure in the mixing container 1 is 1000 kPa before reduction to 900 kPa. The pressure is increased by continuously performing replenishment without stopping the supply of the mixed gas from the mixing container 1 to the use point 72.

The HF charging pressure at which HF is charged into the replenishment container 2 in implementation plan 7 is 52 kPa; the amount of HF thereby charged is 1.83 g; and the pressure of the mixed gas before charging the mixing container 1 from the replenishment container 2 is 1000 kPa as described above. Accordingly, the pressure difference used for supply of the mixed gas from the mixing container 1 to the use point 72 is 50 kPa.

Figure 2:
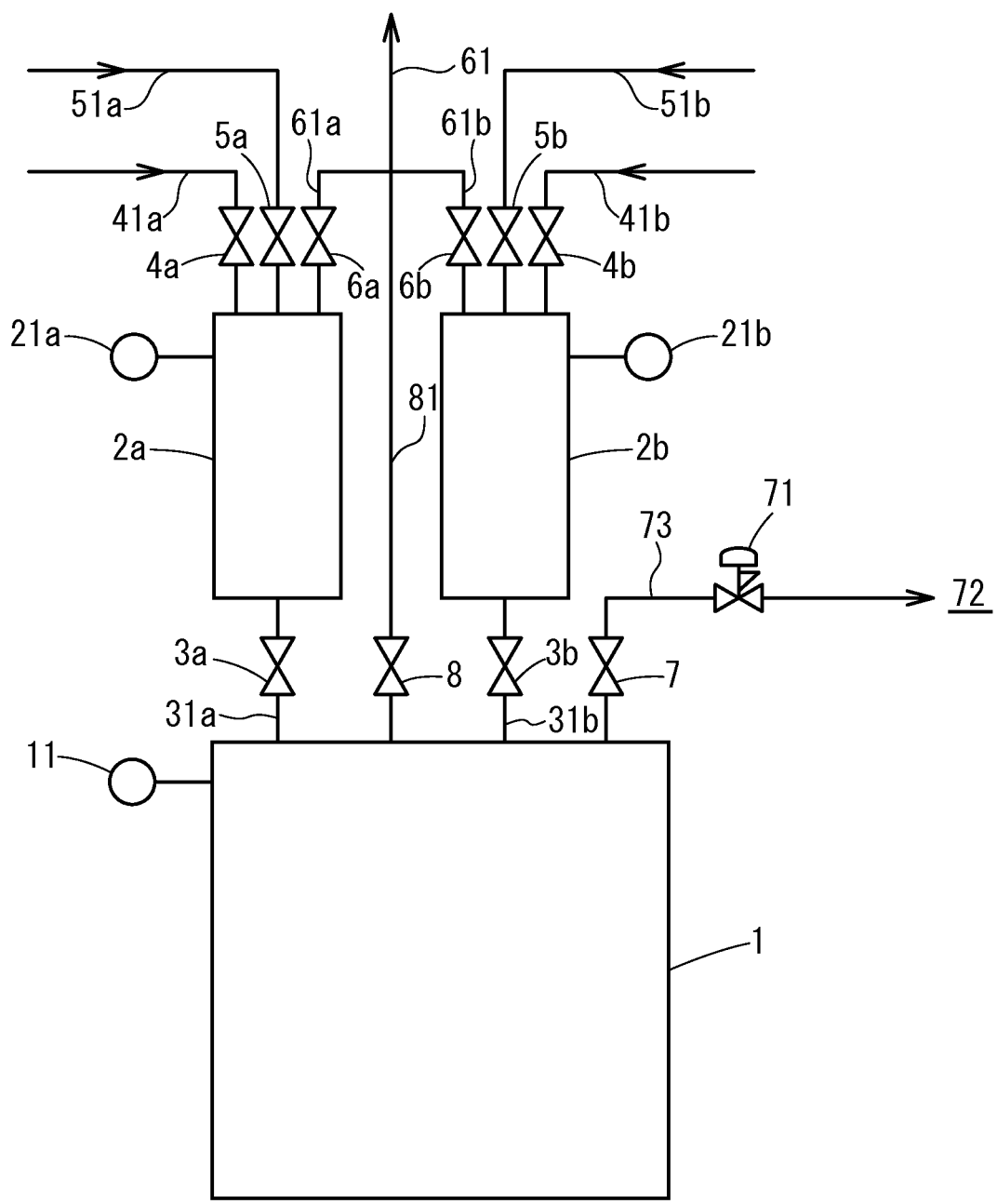
FIG. 2 is a diagram schematically showing an outline of a method and an apparatus for supplying a mixed gas according to a second embodiment of the present invention.

Implementation plan 8 relates to the second embodiment of the present invention shown in FIG. 2, in which two replenishment containers 2a and 2b are formed in place of the replenishment container 2 shown in FIG. 1 according to the first embodiment of the present invention. For the components required by the arrangement having the two replenishment containers as shown in FIG. 2, suffixes a and b are attached to reference numerals in FIG. 1.

The two replenishment containers are formed in implementation plan 8 for the following reason. Charging the replenishment container with the low-vapor-pressure first gas requires evacuating the replenishment container with a vacuum pump before charge and it takes much time to evacuate the replenishment container. In the case where only one replenishment container is provided, therefore, there is a possibility of a hindrance to continuous supply of the mixed gas when the amount of supply of the mixed gas at a use point is large. If two replenishment containers are provided, the first gas in one of the replenishment containers is forced out by the second gas to replenish the mixing container with the mixed gas in a high-pressure state and the first gas in the other replenishment container is successively forced out by the second gas, thus enabling the mixing container to be repeatedly replenished with the mixed gas in the high-pressure state, and continuously performing the supply of the mixed gas to a use point without interruption even when the amount of supply of the mixed gas at the use point is large.

The shape specifications (the internal capacity, the height of the internal space and the diameter of a cross-section of the internal space) and the internal capacities of the two replenishment containers 2a and 2b in implementation plan 8 are the same as those of the replenishment container 2 in implementation plan 5; the internal capacity of each of the two replenishment containers is 4 L, i.e., 1/9.5 of the internal capacity of the mixing container 1; the height of the cylindrical internal space of each replenishment container 2 is 3700 mm; and the diameter of a cross-section of the internal space is 37.1 mm, i.e., about 1/100 of the height.

The HF charging pressure at which HF is charged into the replenishment containers 2a and 2b in implementation plan 8 is 150 kPa; the amount of HF thereby charged is 5.29 g; and the pressure of the mixed gas before charging the mixing container 1 from the replenishment container 2 is 900 kPa, as is that in implementation plans 1 and 5 for example. Accordingly, the pressure difference used for supply of the mixed gas from the mixing container 1 to the use point 72 is 150 kPa with respect to each replenishment container.

Figure 3:
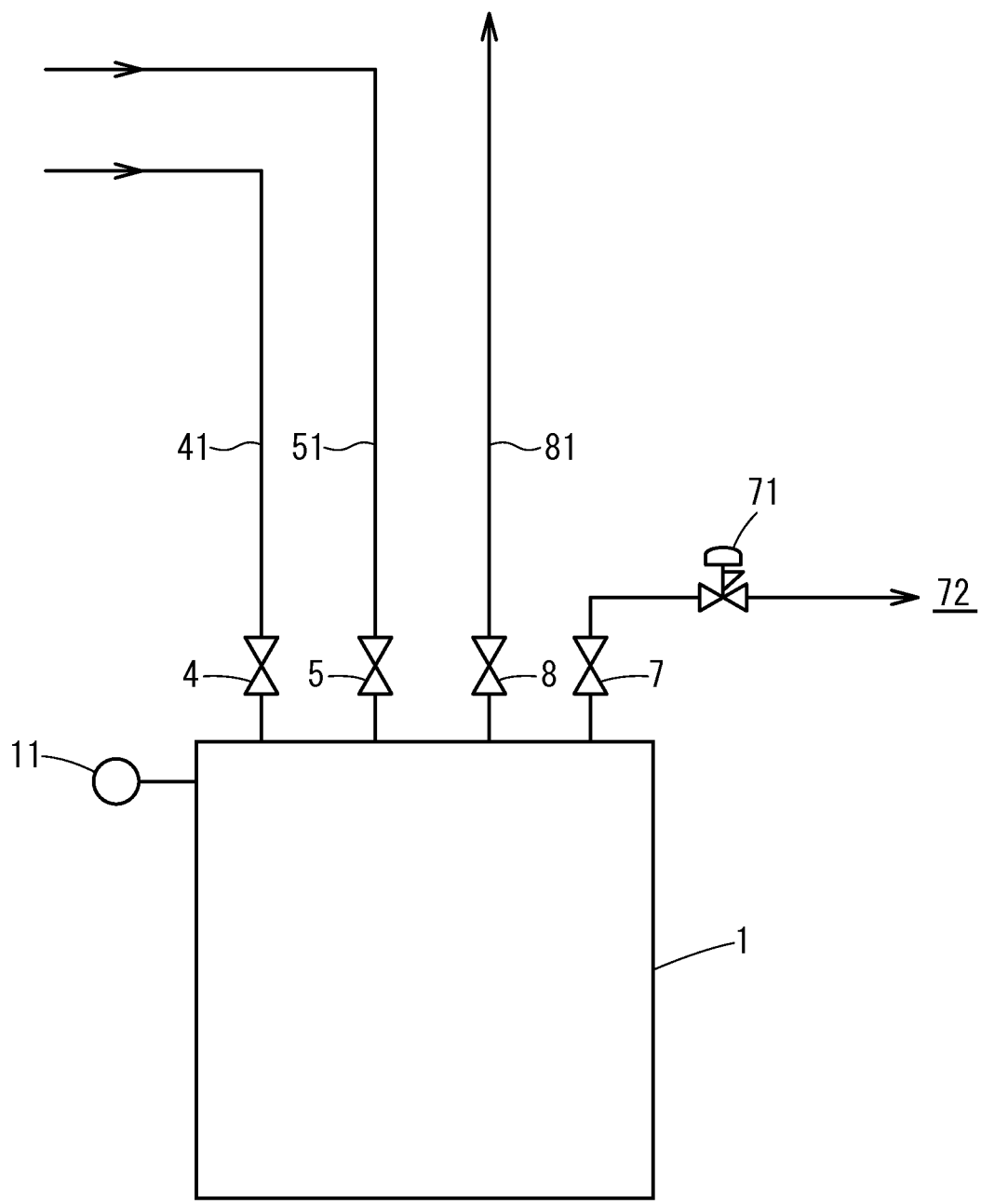
FIG. 3 is a diagram schematically showing an outline of a method and an apparatus for supplying a mixed gas according to a comparative example.

In the comparative example, any one of the replenishment containers 2, 2a, and 2b as features of the first and second embodiments of the present invention is not provided, as shown in FIG. 3. When the mixing container 1 is charged with the mixed gas, the mixing container 1 is first evacuated and charged with HF and a mixed gas at a predetermined pressure is then formed by charge with Ar.

That is, in the comparative example, in the same situation as that described with respect to implementation plans 1 to 8, where HF is used as the first gas; Ar is used as the second gas; the concentration of HF in the mixed gas is set to 10%; the pressure of the mixed gas in the mixing container 1 after charge is set to 1050 kPa; and the pressure in the mixing container 1 is maintained at 900 kPa or higher, the supply to the use point 72 is stopped when the pressure in the mixing container 1 is reduced to a setpoint of 900 kPa as a result of the supply to the use point 72, the mixed gas in the mixing container 1 is discharged with a vacuum pump, and the mixing container 1 thereby evacuated is recharged by being charged with HF at 105 kPa and then with Ar so that the pressure of the mixed gas is set to 1050 kPa.

In the comparative example, as described above, the mixed gas in the mixing container 1 can be supplied only up to a required pressure of the mixed gas at the use point 72 when the required pressure is high, while a large part (about 86%) of the mixed gas in the mixing container 1 remains.

Moreover, while increasing the pressure of the mixed gas in the mixing container 1 requires recharge with HF and Ar, it is unavoidable to discard the mixed gas remaining in the mixing container 1 before charge with HF at a low vapor pressure.

For convenience sake, the volume of the mixing container is shown in square brackets in the cell for the capacity in the replenishment container shape specifications and an HF charging pressure and an amount of charged HF with respect to the mixing container are shown in square brackets in the cells for the HF charging pressure and the amount of charged HF, while no replenishment container is used in the comparative example shown in Table 1.

Advantages over the comparative example will subsequently be described with reference to Table 1 with respect to use and discard of HF in supply of the mixed gas to the use point 72 in implementation plans 1 to 8.

In implementation plans 1 to 8, an operation to charge the mixing container 1 with the mixed gas is performed like that in the comparative example.

The mixed gas in the mixing container 1 is supplied to the use point 72 at a pressure slightly lower than 900 kPa with the pressure control valve 71. The pressure in the mixing container 1 is detected by the pressure detector 11. When the detected pressure is reduced to a set point 900 kPa, 1035 kPa, 950 kPa or 1000 kPa, the replenishment container 2, 2a, or 2b which is connected to the mixing container 1 by the replenishment line 31, 31a, or 31b having the replenishment valve 3, 3a, or 3b, and which is evacuated, is charged with HF until the predetermined pressure shown in Table 1 is reached. Ar adjusted to a pressure slightly higher (10 to 30 kPa) than 1050 kPa with the pressure control valve is charged into the replenishment container 2, 2a, or 2b charged with HF. The replenishment valve 3, 3a, or 3b is simultaneously opened to cause HF in the replenishment container 2, 2a, or 2b to be forced out by Ar, thereby charging the mixing container 1 with the mixed gas in the high-pressure state. When the pressure detected by the pressure detector 11 reaches 1050 kPa, the replenishment valve 3, 3a, or 3b is closed to complete replenishment with the mixed gas.

In implementation plans 1, 3 to 5, and 8, the mixed gas is supplied to the use point 72 until the pressure in the mixing container 1 is reduced to 900 kPa. In implementation plans 1, 3 to 5, and 8, therefore, replenishment of the mixing container 1 with the mixed gas in the high-pressure state from the replenishment container 2, 2a, or 2b is performed by closing the supply valve 7. On the other hand, in implementation plans 2, 6 and 7, replenishment is performed while continuing supplying the mixed gas to the use point 72, since the pressure in the mixing container 1 is higher than 900 kPa. In implementation plans 2, 6 and 7, however, replenishment may also be performed by closing the supply valve 7.

As a preparation for the next replenishment from the replenishment container 2, 2a, or 2b after the completion of replenishment, the gas remaining in the replenishment container 2, 2a, or 2b is discarded with the vacuum pump. HF in the replenishment container 2, 2a, or 2b is almost entirely forced out to the mixing container 1 by Ar, and mixed gas in which a small amount of HF is mixed with Ar and the HF concentration is low remains in the replenishment container 2, 2a, or 2b. This gas is discarded.

Table 1 shows numeric values of extents of discard of HF calculated on the basis of rich experience that the applicants of the present invention have.

That is, when the mixing container is replenished with the mixed gas from the replenishment container, the amount of HF supplied from the mixing container to the use point is known, the extent of mixing of HF with Ar when HF in the replenishment container is forced out by Ar is calculated from the shape and capacity of the replenishment container, and the evacuated replenishment container is charged with the sum of the amount of HF in the replenishment container at the time of completion of replenishment and the amount of HF supplied to the use point.

It is predicted that after supply of the mixed gas to the use point for a long time, the HF concentration in the mixed gas in the mixing container deviates from the set value. Therefore, the HF concentration is periodically measured with the Fourier-transform-type infrared absorption spectrometer connected to the supply line through which the mixed gas is supplied to the use point, and the amount of HF to be charged into the replenishment container is changed in such a direction that the difference between the measured value and the set value is corrected.

The numeric values in Table 1 are as shown below.

HF use rate [%]=100*amount of HF used [g]/
(amount of HF used [g]+amount of HF discarded [g])

HF discard rate [%]=100*amount of HF discarded [g]/(amount of HF used [g]+amount of HF discarded [g])

HF use rate ratio [%] to comparative example=100*implementation plan HF use rate [%]/comparative example HF use rate [%]

HF discard rate ratio [%] to comparative example=100*implementation plan HF discard rate [%]/comparative example HF discard rate [%]

HF discard amount ratio [%] to comparative example=100*implementation plan HF discard amount [g]/comparative example HF discard amount [g]

It was confirmed that each of implementation plans 1 to 8 had advantages over the comparative example in HF use rate and HF discard rate.

In particular, the capacity of the replenishment container is set to 4 L, as in the comparative example, and the shape of the replenishment container can be changed as in implementation plans 1, 4, and 5. This shows that a shape for minimizing the amount of the low-vapor-pressure first gas mixed with the high-vapor-pressure second gas in the replenishment container can be selected according to the requirement at the use point when the mixing container is replenished with the mixed gas from the replenishment container.

It was also confirmed that even when the internal capacity and/or the shape of the replenishment container was changed or when replenishment of the mixing container from the replenishment container was performed before the pressure in the mixing container was reduced to the set point as a lower limit in use, it was possible to maintain the advantages over the comparative example in HF use rate and HF discard rate.

From these implementation plans, it was confirmed that it was possible to maintain the advantages over the comparative example even when the internal capacity of the replenishment container was equal to or larger than $1/100$ of the internal capacity of the mixing container and equal to or smaller than $1/5$ of the internal capacity of the mixing container.

That is, if the internal capacity is smaller than $1/100$, the unit replenishable capacity is small, there is a need to frequently repeat replenishment and a time restriction is imposed on supply of the mixed gas. If the capacity exceeds $1/5$, the space in which the replenishment container is installed is increased, which is undesirable in terms of manufacture of the apparatus. Further, the amount of the first gas discarded is increased.

It was also confirmed that it was possible to maintain the advantages over the comparative example even when the diameter of a cross-section of the internal space of the replenishment container was equal to or larger than $1/100$ of the height of the internal space and equal to or smaller than $1/2$ of the height of the internal space.

With respect to the shape of the replenishment container, it can be understood from implementation plans 1, 4, and 5 that if the inside diameter is increased and if the height is reduced, mixing between HF and Ar is facilitated and the amount of HF discarded is increased, and that if the inside diameter is reduced and if the height is increased, the facility with which HF and Ar are mixed is reduced and the amount of HF discarded is reduced.

However, if the inside diameter of the replenishment container is reduced and if the height of the replenishment container is increased, the time taken to complete replenishment of the mixing container from the replenishment container is increased and, therefore, a setting is made so that the amount of replenishment with the mixed gas exceeds the amount of mixed gas supplied in the case where supply of the mixed gas to the use point is continued while replenishment of the mixing container is being performed.

Also, if the capacity of the replenishment container is increased, the amount of HF discarded is increased and it takes much time to perform replenishment and evacuation. In the case where supply of the mixed gas to the use point is continued, therefore, two or more replenishment containers are provided as in the case of the second embodiment and implementation plan 8.

While the replenishment container has a cylindrical shape in the first and second embodiments described above, the replenishment container of such a shape may have an internal space with a cross-section of an elliptic or polygonal shape. In such a case, the equivalent circle diameter of a cross-section of the internal space of the replenishment container defined by equation (1) shown below is set to a value equal to or larger than $1/100$ of the height of the internal space of the replenishment container and equal to or smaller than $1/2$ of the height.

$$S=\pi D^2/4 \tag{1}$$

D: the equivalent circle diameter (mm)
S: the sectional area of the internal space of the replenishment container (mm²)
π: the ratio of the circumference of a circle to its diameter While the pressure at which the mixed gas is supplied to the use point is set to 900 kPa in terms of absolute pressure in the first and second embodiments described above, setting the supply pressure to a value equal to or higher than 0.5 MPa and equal to or lower than 15 MPa in terms of absolute pressure may suffice because the discard amount reduction effect is high when the supply pressure is about 0.5 MPa or higher.

In the first and second embodiments described above, the amounts of the low-vapor-pressure first gas (HF) and the high-vapor-pressure second gas (Ar) charged into the replenishment container depend on the pressures detected by the pressure detector 21 or the pressure detectors 21a and 21b for detecting the pressure in the replenishment container, and timing of starting and ending replenishment of the mixing container from the replenishment container depends on the pressure detected by the pressure detector 11 for detecting the pressure in the mixing container. However, measured values of integrated flow rates or weights having correlations with the pressures may be used in place of the pressure gage measured values.

INDUSTRIAL APPLICABILITY

The present invention is not limited to the first and second embodiments and implementation plans 1 to 8 described above. In the present invention, various configurations can be taken within the scope of the gist of the present invention by considering the amount of the mixed gas according to a demand, the amount of the mixed gas discarded, the capacity of the mixing container and the replenishment time for example.

The present invention is useful as a method and an apparatus for supplying a mixed gas in a high-pressure state used in a surface processing process such as film forming or etching or in a cleaning process, for example, in semiconductor manufacturing, liquid crystal manufacturing, MEMS manufacturing or solar cell manufacturing and prepared by mixing a low-vapor-pressure gas as an active gas and a high-vapor-pressure gas.

REFERENCE SIGNS LIST

1 Mixing container
2, 2a, 2b Replenishment container
3, 3a, 3b Replenishment valve
31, 31a, 31b Replenishment line
4, 4a, 4b First gas valve
41, 41a, 41b First gas line
5, 5a, 5b Second gas valve
51, 51a, 51b Second gas line
7 Supply valve
72 Use point

The invention claimed is:

1. A method of supplying a mixed gas, in which the mixed gas is prepared by mixing a first gas having a boiling point equal to or higher than 0° C. and equal to or lower than 100° C. and a second gas having a boiling point equal to or lower than −30° C., and in which the mixed gas is supplied to a use point from a mixing container charged with the mixed gas, the method comprising
replenishing the mixing container with the mixed gas when pressure in the mixing container is reduced to a setpoint via supply to the use point,
wherein the replenishing of the mixing container includes
evacuating a replenishment container which is connected to the mixing container,
charging a predetermined amount of the first gas into the replenishment container which is connected to the mixing container by a replenishment line having a replenishment valve, and
charging the second gas into the replenishment container charged with the first gas and simultaneously opening the replenishment valve to cause the first gas in the replenishment container to be forced out by the second gas, whereby the mixing container is replenished with the mixed gas.

2. The method of supplying a mixed gas according to claim 1, wherein the internal capacity of the replenishment container is equal to or larger than $1/100$ of the internal capacity of the mixing container and equal to or smaller than $1/5$ of the internal capacity of the mixing container.

3. The method of supplying a mixed gas according to claim 1, wherein an equivalent circle diameter of a cross-section of an internal space of the replenishment container defined by equation (1):

$$S=\pi D^2/4 \tag{1}$$

where D is the equivalent circle diameter (mm), S is a sectional area of the internal space of the replenishment container (mm$^2$), and $\pi$ is a ratio of a circumference of a circle to its diameter, is equal to or larger than $1/100$ of a height of the internal space of the replenishment container and equal to or smaller than $1/2$ of the height of the internal space of the replenishment container.

4. The method of supplying a mixed gas according to claim 1, wherein the charging of the first gas comprises charging a predetermined amount of the first gas into a plurality of replenishment containers which are connected in parallel with each other to the mixing container by replenishment lines having replenishment valves, and which are evacuated,
wherein in the charging of the second gas into the replenishment container, the replenishment container is a first one of the replenishment containers and the replenishment valve is a first one of the replenishment valves, and the second gas is charged into the first one of the replenishment containers charged with the first gas and the first one of the replenishment valves is simultaneously opened to cause the first gas in the first one of the replenishment containers to be forced out by the second gas so that the mixing container is replenished with the mixed gas while the mixed gas is being supplied from the mixing container to the use point,
and the charging of the second gas further comprises successively charging the second gas into a second one of the replenishment containers charged with the first gas and simultaneously opening a second one of the replenishment valves to cause the first gas in the second one of the replenishment containers to be forced out by the second gas, whereby the mixing container can be repeatedly replenished with the mixed gas.

5. The method of supplying a mixed gas according to claim 1, wherein a pressure at which the mixed gas is supplied to the use point is equal to or higher than 0.5 MPa and equal to or lower than 15 MPa in terms of absolute pressure.

6. An apparatus for supplying a mixed gas, comprising:
a mixing container which is charged with a mixed gas prepared by mixing a first gas having a boiling point equal to or higher than 0° C. and equal to or lower than 100° C. and a second gas having a boiling point equal to or lower than −30° C., and from which the mixed gas is supplied to a use point at a pressure equal to or higher than 0.5 MPa and equal to or lower than 15 MPa in terms of absolute pressure; and
means for replenishing the mixing container with the mixed gas when pressure in the mixing container is reduced to a setpoint as a result of supply of the mixed gas from the mixing container to the use point, wherein the means for replenishing the mixing container includes
a replenishment container having an internal capacity equal to or larger than $1/100$ of an internal capacity of the mixing container and equal to or smaller than $1/5$ of the internal capacity of the mixing container, and an equivalent circle diameter of a cross-section of an internal space of the replenishment container being defined by equation (1):

$$S=\pi D^2/4 \tag{1}$$

where D is the equivalent circle diameter (mm), S is a sectional area of the internal space of the replenishment container (mm$^2$), and $\pi$ is a ratio of a circumference of a circle to its diameter, is equal to or larger than $\frac{1}{100}$ of a height of the internal space of the replenishment container and equal to or smaller than $\frac{1}{2}$ of the height of the internal space of the replenishment container,
- a replenishment line which connects the replenishment container and the mixing container to each other, the replenishment line having a replenishment valve,
- a first container containing the first gas, the first container being connected to the replenishment container by a first gas line having a first gas valve and being charged with a predetermined amount of the first gas when the replenishment container is evacuated and the first gas valve is opened,
- a second container containing the second gas, the second container being connected to the replenishment container by a second gas line having a second gas valve, and
- a vacuum pump connected to the replenishment container by a discharge line having a discharge valve, and detection means for detecting the pressure in the mixing container and for opening the second gas valve to charge the second gas into the replenishment container charged with the first gas when the pressure detected by the detection means is reduced to the setpoint as a result of supply of the mixed gas to the use point, and for simultaneously opening the replenishment valve to cause the first gas in the replenishment container to be forced out by the second gas, whereby the mixing container is replenished with the mixed gas.

7. The apparatus for supplying a mixed gas according to claim 6, wherein an apparatus which performs a surface processing process or a cleaning process is arranged at the use point.

8. The method of supplying a mixed gas according to claim 1, further comprising performing a surface processing process or a cleaning process at the use point.

* * * * *